(12) United States Patent
Giannakis et al.

(10) Patent No.: US 11,792,061 B2
(45) Date of Patent: Oct. 17, 2023

(54) ESTIMATING FREQUENCY-OFFSETS AND MULTI-ANTENNA CHANNELS IN MIMO OFDM SYSTEMS

(71) Applicant: Regents of the University of Minnesota, Minneapolis, MN (US)

(72) Inventors: Georgios B. Giannakis, Minnetonka, MN (US); Xiaoli Ma, Auburn, AL (US)

(73) Assignee: Regents of the University of Minnesota

( * ) Notice: Subject to any disclaimer, the term of this patent is extended or adjusted under 35 U.S.C. 154(b) by 0 days.

(21) Appl. No.: 17/714,926

(22) Filed: Apr. 6, 2022

(65) Prior Publication Data
US 2022/0407763 A1 Dec. 22, 2022

Related U.S. Application Data

(63) Continuation of application No. 16/876,316, filed on May 18, 2020, now Pat. No. 11,303,377, which is a
(Continued)

(51) Int. Cl.
H04L 27/26 (2006.01)
H04L 25/02 (2006.01)
(Continued)

(52) U.S. Cl.
CPC ......... *H04L 27/2626* (2013.01); *H04B 7/046* (2013.01); *H04B 7/0413* (2013.01); *H04B 7/063* (2013.01); *H04B 7/066* (2013.01); *H04J 11/0063* (2013.01); *H04L 5/0016* (2013.01); *H04L 25/0202* (2013.01); *H04L 25/0204* (2013.01); *H04L 25/0228* (2013.01); *H04L 25/0242* (2013.01); *H04L 27/2607* (2013.01); *H04L 27/2613* (2013.01); *H04L 27/2657* (2013.01); *H04L 27/2671* (2013.01); *H04L 27/2672* (2013.01); *H04L 27/2675* (2013.01);
(Continued)

(58) Field of Classification Search
CPC ............ H04L 27/2626; H04L 27/2613; H04L 27/2657; H04L 27/2671; H04L 27/2675; H04L 27/2692; H04L 27/2672; H04L 25/0206; H04L 25/0228; H04L 25/0242; H04L 25/0202; H04B 7/0413; H04B 7/046; H04B 7/066
USPC ......................................................... 375/299
See application file for complete search history.

(56) References Cited

U.S. PATENT DOCUMENTS

| | | | |
|---|---|---|---|
| 2009/0154625 A1* | 6/2009 | Kwak | H04L 27/2684 375/359 |
| 2013/0114451 A1* | 5/2013 | Al-Dhahir | H04B 7/0854 370/252 |

* cited by examiner

*Primary Examiner* — Ted M Wang
(74) *Attorney, Agent, or Firm* — Fish & Richardson P.C.

(57) ABSTRACT

Techniques are described for carrier frequency offset (CFO) and channel estimation of orthogonal frequency division multiplexing (OFDM) transmissions over multiple-input multiple-output (MIMO) frequency-selective fading channels. A wireless transmitter forms blocks of symbols by inserting training symbols within two or more blocks of information-bearing symbols. The transmitter applies a hopping code to each of the blocks of symbols to insert a null subcarrier at a different position within each of the blocks of symbols, and a modulator outputs a wireless signal in accordance with the blocks of symbols. A receiver receives the wireless signal and estimates the CFO, and outputs a stream of estimated symbols based on the estimated CFO.

15 Claims, 12 Drawing Sheets

Related U.S. Application Data continuation of application No. 15/162,978, filed on May 24, 2016, now Pat. No. 10,700,800, which is a continuation of application No. 14/289,294, filed on May 28, 2014, now Pat. No. 9,374,143, which is a continuation of application No. 13/783,039, filed on Mar. 1, 2013, now Pat. No. 8,774,309, which is a continuation of application No. 13/777,993, filed on Feb. 26, 2013, now Pat. No. 8,718,185, which is a continuation of application No. 13/301,482, filed on Nov. 21, 2011, now Pat. No. 8,588,317, which is a continuation of application No. 10/850,961, filed on May 21, 2004, now Pat. No. 8,064,528.

(60) Provisional application No. 60/472,297, filed on May 21, 2003.

(51) Int. Cl.
*H04B 7/0413* (2017.01)
*H04B 7/0456* (2017.01)
*H04B 7/06* (2006.01)
*H04J 11/00* (2006.01)
*H04L 5/00* (2006.01)

(52) U.S. Cl.
CPC ...... *H04L 27/2692* (2013.01); *H04L 27/2695* (2013.01); *H04L 27/26134* (2021.01)

ESTIMATING FREQUENCY-OFFSETS AND MULTI-ANTENNA CHANNELS IN MIMO OFDM SYSTEMS

This application is a continuation of U.S. application Ser. No. 16/876,316, filed May 18, 2020, which is a continuation of U.S. application Ser. No. 15/162,978, filed May 24, 2016 (now U.S. Pat. No. 10,700,800), which is a continuation of U.S. application Ser. No. 14/289,294, filed May 28, 2014 (now U.S. Pat. No. 9,374,143), which is a continuation of U.S. application Ser. No. 13/783,039, filed Mar. 1, 2013 (now U.S. Pat. No. 8,774,309), which is a continuation of U.S. application Ser. No. 13/777,993, filed Feb. 26, 2013 (now U.S. Pat. No. 8,718,185), which is a continuation of U.S. application Ser. No. 13/301,482 (now U.S. Pat. No. 8,588,317), filed Nove. 21, 2011, which is a continuation of U.S. application Ser. No. 10/850,961, filed May 21, 2004 (now U.S. Pat. No. 8,064,528), which claims the benefit of U.S. Provisional Application Ser. No. 60/472,297, filed May 21, 2003, the entire content of each being incorporated herein by reference

STATEMENT REGARDING FEDERALLY SPONSORED RESEARCH OR DEVELOPMENT

This invention was made with Government support under CCR-0105612 awarded by the National Science Foundation and DAAD19-01-2-011 awarded by the Army Research Office. The Government has certain rights in the invention.

TECHNICAL FIELD

The invention relates to communication systems and, more particularly, carrier frequency offset estimation and channel estimation in communication systems.

BACKGROUND

Providing reliable high data rate services, e.g. real-time multimedia services, over wireless communication channels is a paramount goal in developing coding and modulation schemes. When a data rate for wireless communication systems is high in relation to bandwidth, multipath propagation may become frequency-selective and cause intersymbol interference (ISI). Multipath fading in wireless communication channels causes performance degradation and constitutes the bottleneck for increasing data rates.

Orthogonal frequency division multiplexing (OFDM) is inherently resistant to multipath fading and has been adopted by many standards because it offers high data-rates and low decoding complexity. For example, OFDM has been adopted as a standard for digital audio broadcasting (DAB) and digital video broadcasting (DVB) in Europe and high-speed digital subscriber lines (DSL) in the United States. OFDM has also been proposed for local area mobile wireless broadband standards including IEEE 802.11a, IEEE 802.11g, MIMAC and HIPERLAN/2. Additionally, space-time (ST) multiplexing with multiple antenna arrays at both the transmitter and receiver are effective in mitigating fading and enhancing data rates. Therefore, multi-input multi-output (MIMO) OFDM is attractive for multi-user wireless communication systems. However, MIMO OFDM systems have increasing channel estimation complexity as the number of antennas increases due to the increased number of unknowns which must be estimated and have great sensitivity to carrier frequency offsets (CFO).

Typical single-input single-output (SISO) OFDM systems rely on blocks of training symbols or exploit the presence of null sub-carriers in order to acquire channel state information (CAI) to mitigate CFO and perform channel estimation. In the IEEE 802.11a, IEEE 802.11g, and HIPERLAN/2 standards, sparsely placed pilot symbols are present in every OFDM symbol and pilot symbols are placed in the same positions from block to block. Additionally, channel estimation is performed on a per block basis.

For channel state information (CSI) acquisition, three classes of methods are available: blind methods which estimate CSI solely from the received symbols; differential methods that bypass CSI estimation by differential encoding; and input-output methods which rely on training symbols that are known a priori to the receiver. Relative to training based schemes, differential approaches incur performance loss by design, while blind methods typically require longer data records and entail higher complexity. Although training methods can be suboptimal and are bandwidth consuming, training methods remain attractive in practice because they decouple symbol detection from channel estimation, thereby simplifying receiver complexity and relaxing the required identifiability conditions.

SUMMARY

In general, the invention is directed to techniques for carrier frequency offset (CFO) and channel estimation of orthogonal frequency division multiplexing (OFDM) transmissions over multiple-input multiple-output (MIMO) frequency-selective fading channels. In particular, techniques are described that utilize training symbols such that CFO and channel estimation are decoupled from symbol detection at the receiver. Unlike conventional systems in which training symbols are inserted within a block of space-time encoded information-bearing symbols to form a transmission block, the techniques described herein insert training symbols over two or more transmission blocks. Furthermore, training symbols may include both non-zero symbols and zero symbols and are inserted so that channel estimation and CFO estimation are performed separately. Zero symbols, referred to as null subcarriers, are utilized that change position, i.e. "hop", from block to block. In this manner, the information-bearing symbols and training symbols are received in a format in which the training symbols are easily separated from the information-bearing symbols, thereby enabling CFO estimation to be performed prior to channel estimation.

In one embodiment, the invention is directed to a method comprising forming blocks of symbols by inserting training symbols within two or more blocks of information-bearing symbols; applying a hopping code to each of the blocks of symbols to insert a null subcarrier at a different position within each of the blocks of symbols; and outputting wireless transmission signal in accordance with the blocks of symbols.

In another embodiment, the invention is directed to a method comprising receiving a wireless signal transmitted from a stream of blocks of symbols, wherein each block of symbols includes one or more information-bearing symbols, one or more training symbols, and at least one null subcarrier at a different position within each of the blocks of symbols. The method further comprises outputting estimated symbols based on the received wireless signal.

In another embodiment, the invention is directed to a wireless communication device comprising a training symbol insertion module to form blocks of symbols by inserting training symbols within two or more blocks of information-bearing symbols, wherein the training symbol insertion module applies a hopping code to each of the blocks of symbols to insert a null subcarrier at a different position within each of the blocks of symbols; and a modulator to output a wireless transmission signal in accordance with the blocks of symbols.

In another embodiment, the invention is directed to a wireless communication device comprising: one or more antennas that receive a wireless signal transmitted from a stream of blocks of symbols, wherein each block of symbols includes one or more information-bearing symbols, one or more training symbols, and at least one null subcarrier at a different position within each of the blocks of symbols; an carrier frequency offset estimator to estimate a carrier frequency offset of the received signal based on the positions of the null subcarriers; and a decoder to output a stream of estimated symbols based on the received wireless signal and the estimated carrier frequency offset.

In another embodiment, the invention is directed to a computer-readable medium containing instructions. The instructions cause a programmable processor to form blocks of symbols by inserting training symbols within two or more blocks of information-bearing symbols; apply a hopping code to each of the blocks of symbols to insert a null subcarrier at a different position within each of the blocks of symbols; and output wireless transmission signal in accordance with the blocks of symbols.

The described techniques may offer one or more advantages. For example, instead of performing CFO and MIMO channel estimation on a per block basis, several transmission blocks are collected by a receiver for estimating CFO and the MIMO frequency-selective channels, thereby resulting in an efficient use of bandwidth. Further, because the training symbols are inserted in a manner that decouples CFO and channel estimation from symbol detection, low-complexity CFO and channel estimation can be performed. Moreover, the described techniques allow for full acquisition range of the CFO estimator and identifiability of the MIMO channel estimator.

Other advantages of performing block equalization may include improved bit-error-rate (BER) performance relative to typical techniques and flexibility to adjust the number of blocks collected to perform channel estimation. Because of the improved BER performance, less expensive voltage controlled oscillators may be used. Additionally, the training patterns of the described techniques can easily be implemented by current OFDM standards, such as IEEE 802.11a and IEEE 802.11g.

The details of one or more embodiments of the invention are set forth in the accompanying drawings and the description below. Other features, objects, and advantages of the invention will be apparent from the description and drawings, and from the claims.

DETAILED DESCRIPTION

Throughout the Detailed Description bold upper letters denote matrices, bold lower letters stand for column vectors, $(\bullet)^T$ and $(\bullet)^H$ denote transpose and Hermitian transpose, respectively; $(\bullet)^*$ denotes conjugate and $\lfloor \bullet \rfloor$ denotes the nearest integer. $E[\bullet]$ stands for expectation and $\text{diag}[x]$ stands for a diagonal matrix with x on its main diagonal; matrix $D_N(h)$ with a vector argument denotes an N×N diagonal matrix with $D_N(h)=\text{diag}[h]$. For a vector, $\|\bullet\|$ denotes the Euclidian norm. $[A]_{k,m}$ denotes the (k, m)th entry of a matrix A, and $[x]_m$ denotes the mth entry of the column vector x; $I_N$ denotes the N×N identity matrix; ei denotes the (i+1)st column of $I_N$; $[F_N]_{m,m}=N^{(1/2)}\exp(-j2\Pi mn/N)$ denotes the N×N fast fourier transform (FFT) matrix; and we define $f:=[1, \exp(j\omega), \ldots, \exp(j(N-1)w)^T$.

Figure 1:
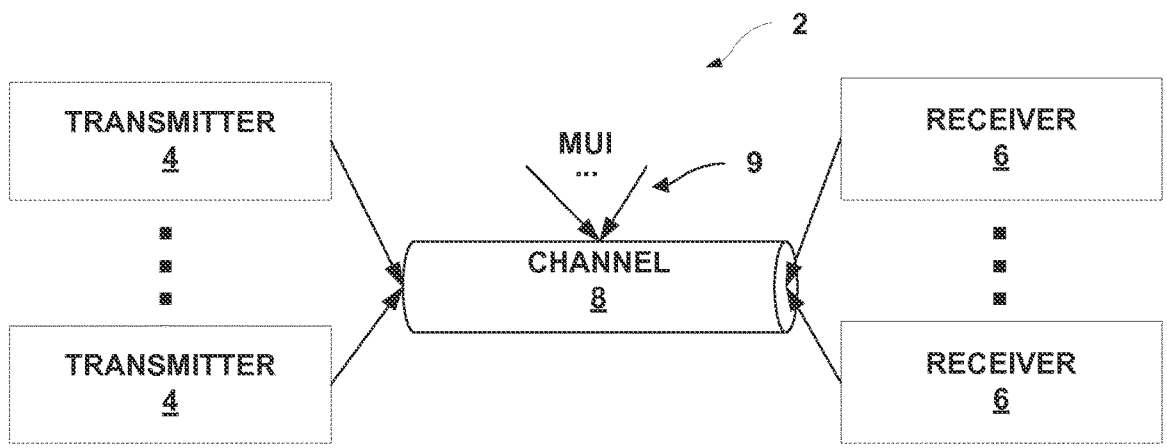
FIG. 1 is a block diagram illustrating an exemplary wireless multi-user communication system in which multiple transmitters communicate with multiple receivers through a wireless communication channel.

FIG. 1 is a block diagram illustrating a multi-user wireless communication system 2 in which multiple transmitters communicate with multiple receivers 6 through wireless communication channel 8. In general, the invention describes techniques for performing carrier frequency offset (CFO) and channel estimation of orthogonal frequency division multiplexing (OFDM) transmissions output by transmitters 4 over multiple-input multiple-output (MIMO) frequency-selective fading channel 8. As described herein, the techniques maintain orthogonality among subcarriers of OFDM transmissions through channel 8 allowing low-complexity receivers 6 and full acquisition range of the CFO.

Transmitters 4 output a transmission signal in accordance with a block of symbols in which two or more training symbols are inserted and in which a hopping code is applied. A block of training symbols including two or more training symbols may be inserted within a block of space-time encoded information-bearing symbols. A hopping code may then be applied to the resulting block of symbols to insert a null subcarrier, i.e. zero symbol, within the block symbols such that the null subcarrier changes position, i.e. "hops", from block to block. Unlike conventional systems in which training symbols are inserted within a single transmission block, the techniques described herein insert training symbols over two or more transmission blocks. Consequently, transmitters 4 may insert a sequence of training symbols over two or more transmission blocks, thereby increasing bandwidth efficiency because smaller blocks of training symbols may be used. Receivers 6 may then collect the training symbols inserted within the two or more transmission blocks in order to perform channel estimation. Furthermore, the information-bearing symbols and training symbols are received through communication channel 8 by receivers 6 in a format in which the training symbols are easily separated from the information-bearing symbols, thereby enabling CFO estimation to be performed prior to channel estimation. As a result, the techniques described herein may have improved bit-error-rate (BER) performance over conventional alternatives.

The described techniques can work with any space-time encoded transmission and is backwards compatible with OFDM which has been adopted as a standard for digital audio broadcasting (DAB) and digital video broadcasting (DVB) in Europe and high-speed digital subscriber lines (DSL) in the United States. OFDM has also been proposed for local area mobile wireless broadband standards including IEEE 802.11a, IEEE 802.11g, MMAC and HIPERLAN/2.

The techniques described herein apply to uplink and downlink transmissions, i.e., transmissions from a base station to a mobile device and vice versa. Transmitters 4 and receivers 6 may be any device configured to communicate using a multi-user wireless transmission including a cellular distribution station, a hub for a wireless local area network, a cellular phone, a laptop or handheld computing device, a personal digital assistant (PDA), a Bluetooth™ enabled device, and other devices.

Figure 2:
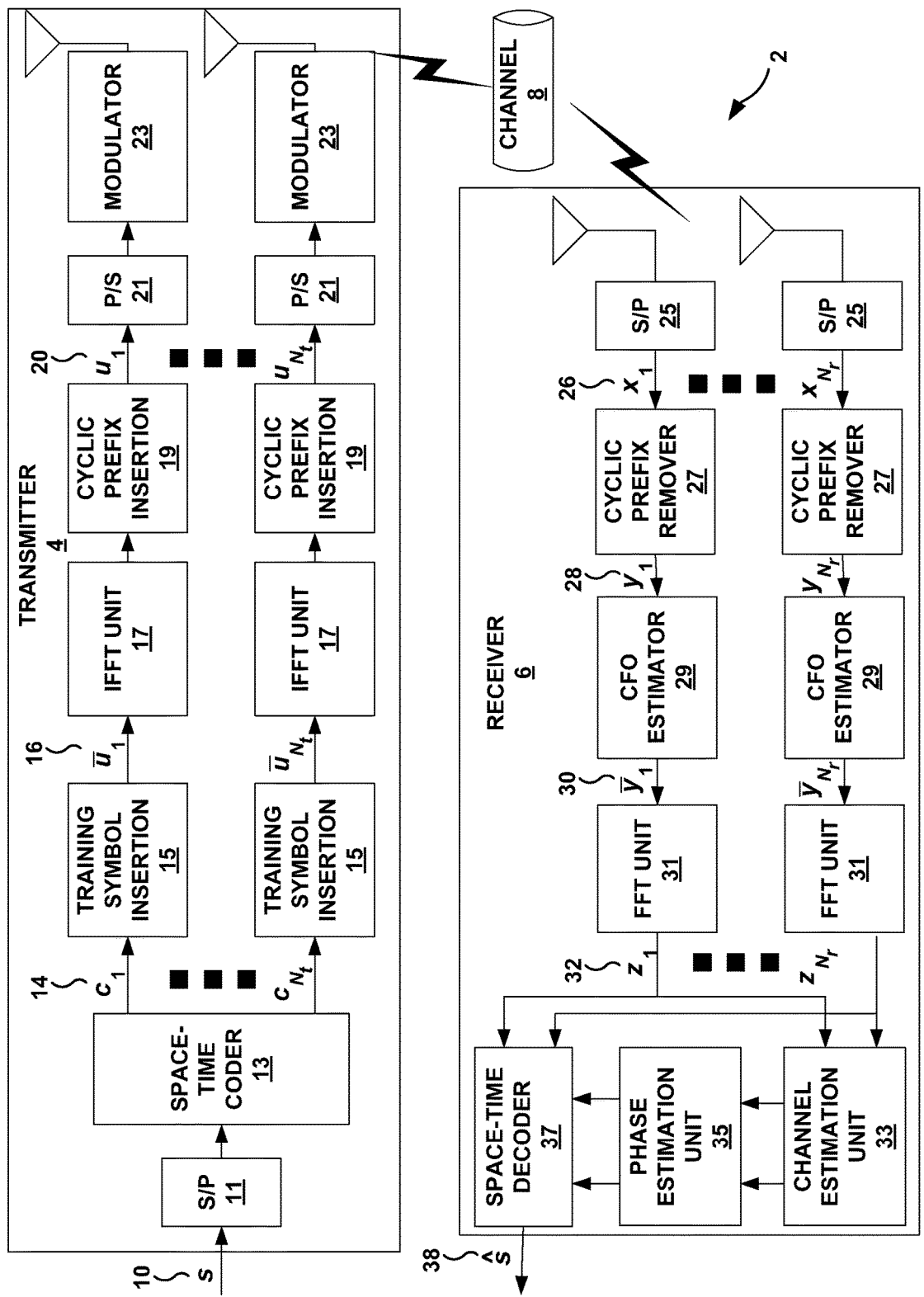
FIG. 2 is a block diagram illustrating in further detail one embodiment of a transmitter and a receiver within the multi-user communication system of FIG. 1.

FIG. 2 is a block diagram illustrating in further detail the multi-user communication system of FIG. 1. In particular, FIG. 2 illustrates exemplary embodiments of multi-antenna transmitter 4 and multi-antenna receiver 6 communicating over MIMO frequency-selective channel 8 in the presence of a CFO. Multi-antenna transmitter 4 and multi-antenna receiver 6 have $N_t$ and $N_r$ antennas, respectively. While OFDM transmissions are inherently resilient to multipath fading, OFDM transmissions are more sensitive to frequency offsets than single carrier systems. Frequency offsets can occur when a voltage controlled oscillator (VCO) of receiver 6 is not oscillating at exactly the same carrier frequency as a VCO of transmitter 4 and can also occur as a result of the Doppler effect. When the frequency offset is permanent, it is typically referred to as a carrier frequency offset and when the frequency offset varies over time, it is typically referred to as phase noise. Frequency offsets cause a degradation in BER performance because the orthogonality among subcarriers is destroyed and the subcarriers can interfere with each other.

Generally, receiver 6 corresponds to a particular user performing CFO and channel estimation of OFDM transmissions output by transmitter 4 through MIMO frequency-selective fading channel 8 in the presence of a CFO. Each information-bearing symbol s(n) 10 is selected from a finite alphabet and input into serial to parallel converter (S/P) 11 which parses Ns information-bearing symbols from a serial stream of information-bearing symbols into blocks of information-bearing symbols. The nth entry of the kth block of the block of information-bearing symbols is denoted $[s(k)]_n = s(kN_s+n)$. Space-Time coder 13 encodes and/or multiplexes each block s(k) in space and time to yield blocks $\{c_\mu(k)\}_{\mu=1}^{N_t}$ 14 of length Nc. Space-Time coder 13 may apply any space-time code to yield blocks $\{c_\mu(k)\}_{\mu=1}^{N_t}$ 14 for each respective transmit antenna of multi-antenna transmitter 4.

Each of training symbol insertion units 15 inserts two or more training symbols, which may have non-zero or zero values, within space-time encoded blocks $\{c_\mu(k)\}_{\mu=1}^{N_t}$ 14 and applies a hopping code to blocks $\{c_\mu(k)\}_{\mu=1}^{N_t}$ 14 to form a vectors $\bar{u}_\mu(k)$ 16 with length N for the μth antenna of multi-antenna transmitter 4. Applying the hopping code inserts a null subcarrier which changes position, i.e. "hops", from block to block. Each subcarrier corresponding to a zero symbol is referred to as a null subcarrier. Unlike conventional systems in which training symbols are inserted within a single transmission block, each of training symbol insertion units 15 may insert training symbols over two or more blocks. Consequently, transmitter 4 may insert a sequence of training symbols over two or more blocks $\{c_\mu(k)\}_{\mu=1}^{N_t}$ 14. Sparsely inserting training symbols increases the bandwidth efficiency of communication system 2 because fewer training symbols may be inserted per block $\{c_\mu(k)\}_{\mu=1}^{N_t}$ 14. In some embodiments, each of training symbol insertion units 15 may insert a particular number of training symbols per block $\{c_\mu(k)\}_{\mu=1}^{N_t}$ 14 based on channel 8's coherence time and the pertinent burst duration, e.g. if the burst is long fewer training symbols may be inserted per block $\{c_\mu(k)\}_{\mu=1}^{N_t}$ 14. Furthermore, training symbols may be inserted in accordance with existing OFDM standards such as IEEE 802.11a and IEEE 802.11g. Training symbol insertion units 15 are described in greater detail below using notation introduced in the following paragraphs.

Subsequent to the insertion of training symbols, MIMO OFDM is implemented. In particular, each of inverse fast Fourier transform (IFFT) units 17 implement N-point IFFT via left multiplication with $F_N^H$ on each corresponding block $\bar{u}_\mu(k)$ 16 and each of cyclic prefix insertion units 19 insert a cyclic prefix via left multiplication with the appropriate matrix operator $T_{cp} := [I_{L \times N}^T \ I_N^T]^T$, where $I_{L \times N}^T$ represents the last L columns of $I_N$. Each of parallel to serial converters (P/S) 21 then parses the resulting blocks $\{u_\mu(k) = T_{cp} F_N^H \bar{u}_\mu(k)\}_{\mu=1}^{N_t}$ of size P×1 into a serial symbol stream. Each of modulators 23 modulate the corresponding P×1 blocks which are transmitted by the $N_t$ transmit antennas over frequency-selective communication channel 8.

Generally, communication channel 8 can be viewed as an $L^{th}$ order frequency-selective channel from the μth transmit antenna of transmitter 4 to the νth receive antenna of receiver 6. Consequently, communication channel 8 can be represented in the discrete-time equivalent form $h^{(\nu,\mu)}$ (l), l ∈ [0, L] and incorporates transmit and receive filters, $g_\mu(t)$ and $g_\nu(t)$ respectively, as well as frequency selective multipath $g_{\nu,\mu}(t)$, i.e. $h^{(\nu,\mu)}(l) = g_\mu \star g_{\nu,\mu} \star g_\nu(t)|_{T=lT}$, where ★ denotes convolution and Tis the sampling period which may be chosen to be equivalent to the symbol period.

Transmissions over communication channel 8 experience a frequency offset, $f_o$ in Hertz, which may be caused by a mismatch between a voltage controlled oscillator (VCO) of transmitter 4 and a VCO of receiver 6 or may also be caused by the Doppler effect. In the presence of a frequency offset, the samples at νth receive antenna can be represented according to equation (1) below, where $\omega_o := 2 \Pi f_o T$ is the normalized CFO, $N_r$ is the number of receive antennas, and $\eta_\nu(n)$ is zero-mean, white, complex Gaussian distributed noise with variance $\sigma^2$.

$$X_\nu(n) = \sum_{\mu=1}^{N_t} e^{j\omega_\nu n} \sum_{l=0}^{L} h^{(\nu,\mu)}(l) u_\mu(n-l) + \eta_\nu(n), \nu \in [1, Nr] \quad (1)$$

Each of serial to parallel converters (S/P) 25 convert a respective received sequence x(n) into a corresponding P×1 block 26 with entries $[x_\nu(k)]_p := x_\nu(kP+p)$. By selecting block size P greater than channel order L each received block $x_\nu(k)$ 26 depends only on two consecutive transmitted blocks, $u_\mu(k)$ and $u_\mu(k-1)$ which is referred to as inter-block interference (IBI). In order to substantially eliminate IBI at receiver 6, each of cyclic prefix removers 27 removes the cyclic prefix of the corresponding blocks $x_\nu(k)$ 26 by left multiplication with the matrix $R_{cp} := [0_{N \times L} \ I_N]$. The resulting IBI-free block can be represented as $y_\nu(k) := R_{cp} x_\nu(k)$ 28. Equation (2) below can be used to represent the vector-matrix input-output relationship, where $\eta_\nu(k) := [\eta_\nu(kP), \eta_\nu(kP+1), \ldots, \eta_\nu(kP+P-1)]^T$, with P=N+L; $H^{(\nu,\mu)}$ is a P×P lower triangular Toeplitz matrix with first column $[h^{(v,\mu)}(0), \ldots, h^{(v,\mu)}(L), 0, \ldots, 0]^T$; and $D_P(\omega_o)$ is a diagonal matrix defined as $D_P(\omega_o):=\mathrm{diag}[1, e^{j\omega_o}, \ldots, e^{j\omega_o(P-1)}]$.

$$y_v(k) = \sum_{\mu=1}^{N_t} e^{jw_v kP} R_{cp} D_P(w_o) H^{(v,\mu)} T_{cp} F_N^H \overline{u}_\mu(k) + R_{cp} \eta_v(k), \; v \in [1, N_r] \quad (2)$$

Based on the structure of the matrices involved, it can be readily verified that $R_{cp}D_P(w_v) = e^{j\omega_o L} D_N$, where $D_N(w_v) := \mathrm{diag}[1, e^{j\omega_o}, \ldots e^{j\omega_o(P-1)}]$. Following this identity, we define the N×N matrix $\tilde{H}^{(v,\mu)} := R_{cp}H^{(v,\mu)} T_{cp}$, as a circulant matrix with first column $[h^{(v,\mu)}(0), \ldots, h^{(v,\mu)}(L), 0, \ldots, 0]^T$. Letting also $v_v(k) := R_{cp}\eta_v(k)$, equation (2) can be rewritten according to equation (3).

$$y_v(k) = e^{jw_v(kP+L)} D_N(w_o) \sum_{\mu=1}^{N_t} \tilde{H}^{(v,\mu)} F_N^H \overline{u}_\mu(k) + v_v(k), \; v \in [1, N_r] \quad (3)$$

In the absence of a CFO, taking the FFT of $y_v(k)$ 28 renders the frequency-selective channel 8 equivalent to a set of flat-fading channels, since $F_N^H \tilde{H}^{(v,\mu)} F_N^H$ is a diagonal matrix $D_N(\tilde{h}^{(v,\mu)})$, where $\tilde{h}^{(v,\mu)} := [\tilde{h}^{(v,\mu)}(0), \ldots, \tilde{h}^{(v,\mu)}(2\Pi(N-1)/N)]^T$, with $$\tilde{h}^{(v,\mu)}(2\prod n/N) := \sum_{l=0}^{L} \tilde{h}^{(v,\mu)}(l)\exp(-j2\pi nl/N)$$

representing the (v,μ)th channel's frequency response vales on the FFT grid. However, in the presence of a CFO, the orthogonality of subcarriers is destroyed and the channel cannot be diagonalized by taking the FFT of $y_v(k)$ 28. In order to simplify the input-output relationship, $F_N^H F_N = I_N$ can be inserted between $D_N(w_o)$ and $\tilde{H}^{(v,\mu)}$ to re-express equation (3) as equation (4).

$$y_v(k) = e^{jw_v(kP+L)} D_N(w_o) \sum_{\mu=1}^{N_t} F_N^H D_N(\tilde{h}^{(v,\mu)}) \overline{u}_\mu(k) + v_v(k), \; v \in [1, N_r] \quad (4)$$

From equation (4) it can be deduced that estimating the CFO and the multiple channels based on $\{y_v(k)\}_{v=1}^{N_r}$ 28 is a nonlinear problem. Given $\{y_v(k)\}_{v=1}^{N_r}$ 28, the CFO $\omega_o$ and the $N_t N_r$ channels $h^{(v,\mu)} := [h^{(v,\mu)}(0), \ldots, h^{(v,\mu)}]^T$ in MIMO OFDM communication system 2 are estimated based on the training symbols inserted by training symbol insertion unit 15.

Although $\overline{u}_\mu(k)$ 16 contains both information-bearing symbols and training symbols, separation of the information-bearing symbols and training symbols is challenging due to the presence of CFO $\omega_0$. Each of training symbol insertion units 15 inserts two or more training symbols within the corresponding information-bearing symbols $C_\mu(k)_{\mu=1}^{N_t}$ so that CFO estimation can be separated from MIMO channel estimation. The insertion of the training symbols is performed in two steps.

In the first step, each of training symbol insertion units 15 inserts a block of training symbols $b_\mu(k)$ into the corresponding block of information bearing symbols $C_\mu(k)_{\mu=1}^{N_t}$ in accordance with equation (5), where the two permutation matrices $P_A$, $P_B$ have sizes K×$N_c$ and K×$N_b$ respectively, and are selected to be mutually orthogonal, i.e. $P^T_A$, $P_B = 0_{N_c \times N_b}$.

$$\tilde{u}_\mu(k) = P_A c_\mu(k) + P_B b_\mu(k) \quad (5)$$

It is important to note that $N_c + N_b = K$ and K<N. In some embodiments, $P_A$ may be formed with the last $N_c$ columns of $I_{N_c+N_b}$, and $P_B$ with the first $N_b$ columns of $I_{N_c+N_b}$ in accordance with equations (6) and (7), respectively.

$$P_A = [e_{N_b} \ldots e_{K-1}] \quad (6)$$

$$P_A = [e_0 \ldots e_{N_b-1}] \quad (7)$$

Figure 3:
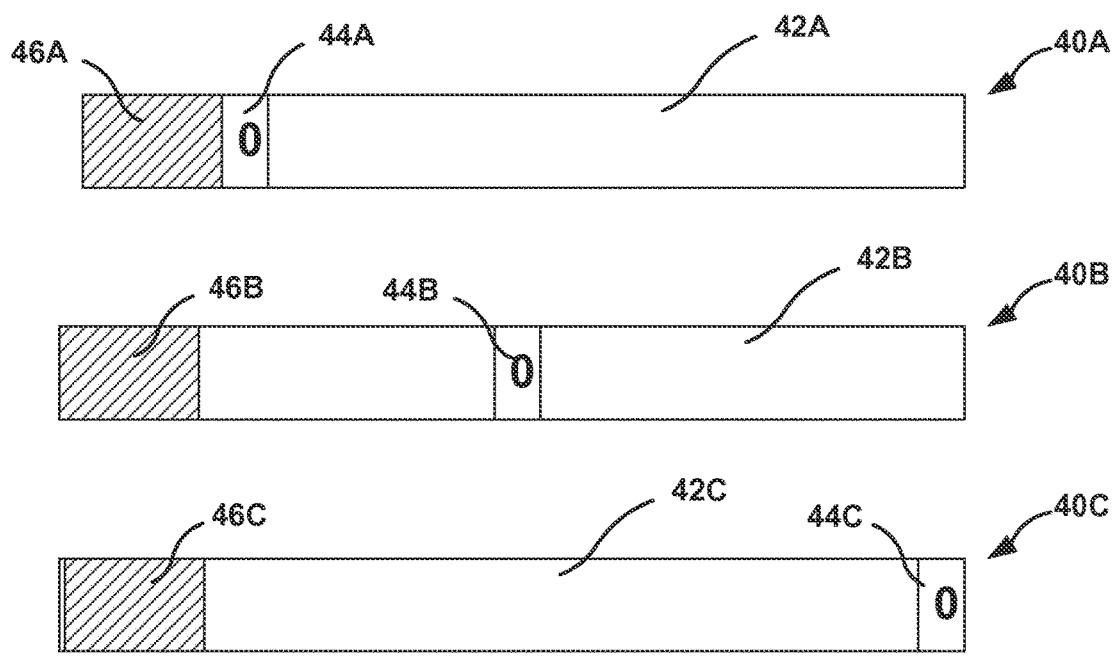
FIG. 3 illustrates example transmission blocks generated by the transmitter of FIG. 2.

The block of training symbols $b_\mu(k)$ may comprise two or more training symbols and has length Nb. Moreover, $b_\mu(k)$ may be one block of training symbols in a training sequence including two or more blocks of training symbols. By sparsely inserting the training symbols, bandwidth efficiency of communication system 2 can be increased. The resulting structure of $\tilde{u}_\mu(k)$ in equation (5) is illustrated in FIG. 3. The structure of $b_\mu(k)$ is described in greater detail below.

In the second step, N-K zeros are inserted per block $\tilde{u}_\mu(k)$ to obtain $\overline{u}_\mu(k)$. This insertion can be implemented by left-multiplying $\tilde{u}_\mu(k)$ with the hopping code $T_{sc}$ given in equation (8), where $q_k := k\lfloor N/(L+1) \rfloor$.

$$T_{sc}(k) := [e_{qk}(\mathrm{mod}\, N), \ldots, e_{qk+K-2(\mathrm{mod}\, N)}] \quad (8)$$

Applying the hopping code given in equation (8) inserts a zero symbol referred to as a null subcarrier in each block $\tilde{u}_\mu(k)$. Dependence of T on the block index k implies that the position of the inserted null subcarrier changes from block to block. In other words, equation (8) implements a null subcarrier "hopping" operation from block to block. By substituting equations (8) and (5) into equation (4) it can be deduced that the resulting signal at the with receive antenna takes the form of equation (9) given below.

$$y_v(k) = \sum_{\mu=1}^{N_t} e^{jw_v(kP+L)} D_N(w_v) F_N^H D_N(\tilde{h}_N^{v,\mu}) T_{sc}(k) \overline{u}_\mu(k) + v_v(k) \quad (9)$$

Therefore, each of training symbol insertion units 15 inserts zero and non-zero training symbols which are used by each of CFO estimators 29 and channel estimation unit 33 to estimate the CFO $\omega_o$ and communication channel 8. The null subcarrier is inserted so that the position of the null subcarrier hops from block to block and enables CFO estimation to be separated from MIMO channel estimation. Consequently, the identifiability of the CFO estimator can be established and the minimum mean square error (MMSE) of the MIMO channel estimator can be achieved.

If CFO $\omega_o$ was absent, i.e. $\omega_o = 0$, then the block of training symbols $b_\mu(k)$ could be separated from the received OFDM transmission signal and by collecting the training blocks of a training sequence, communication channel 8 could be estimated using conventional techniques. However, the CFO destroys the orthogonality among subcarriers of the OFDM transmission signal and the training symbols are mixed with the unknown information-bearing symbols and channels. This motivates acquiring the CFO first, and subsequently estimating the channel.

Each of CFO estimators 29 applies a de-hopping code in accordance with equation (10) on a per block basis.

$$D_N^H(k) = \mathrm{diag}\left[1, e^{-j\frac{2\pi}{N}qk}, \ldots, e^{-j\frac{2\pi}{N}qk(N-1)}\right] \quad (9)$$

Because hopping code $T_{sc}$ is a permutation matrix and $D_N(\tilde{h}^{(v,\mu)})$ is a diagonal matrix, it can be verified that $D_N(\tilde{h}^{(v,\mu)}) T_{sc}(k) = T_{sc}(k) D_K(\tilde{h}^{(v,\mu)}(k))$, where $\tilde{h}^{(v,\mu)}$ is formed by permuting the entries of $h^{(v,\mu)}$ as dictated by $T_{sc}(k)$. Using the de-hopping code given in equation (10), the identity given in equation (11) can be established, where $T_{zp} := [I_K 0_{K \times (N-K)}]$ is a zero-padding operator.

$$D_N^H(k) F_N^H T_{sc}(k) = F_N^H T_{zp} \quad (11)$$

By multiplying equation (9) by the de-hopping code and using equation (11), equation (12) is obtained, where $g_v(k) := \sum_{\mu=1}^{N_t} D_K(\tilde{h}^{(v,\mu)}(k)) \bar{u}_\mu(k)$ and $\bar{v}_v(k) := D_N^H(k) v_v(k)$.

$$\bar{y}_v(k) = D_N^H(k) y_v(k) = e^{j w_v (kP+L)} D_N(w_v) F_N^H T_{zp} g(k) + \bar{v}_v(k) \quad (12)$$

Equation (12) shows that after de-hopping, null subcarriers in different blocks are at the same location because $T_{zp}$ does not depend on the block index k.

As a result, the covariance matrix of $\bar{y}_v(k)$ 30 is given according to equation (13) where the noise $\bar{v}_v(k)$ has covariance matrix $\sigma^2 I_N$.

$$R_{\bar{y}v} = D_N(w_o) F_N^H T_{zp} E[g(k) g^H(k)] \cdot T_{zp}^H F_N^H D_N^H(w_v) + \sigma^2 I_N \quad (13)$$

Assuming that the channels are time invariant over M blocks, and the ensemble correlation matrix $R_{\bar{y}v}$ replaced by its sample estimate given in equation (14) which is formed by averaging across M blocks, where M>K.

$$\hat{R}_{\bar{y}v} = \frac{1}{M} \sum_{k=0}^{M-1} \bar{y}_v(k) \bar{y}_v^H(k) \quad (14)$$

The column space of $R_{\bar{y}v}$ has two parts: the signal subspace and the null subspace. In the absence of CFO, if $E[g(k) g^H(k)]$ has full rank, the null space of $R_{\bar{y}v}$ is spanned by the missing columns, i.e. the location of the null subcarriers, of the FFT matrix. However, the presence of CFO introduces a shift in the null space. Consequently, a cost function can be built to measure this CFO-induced phase shift. Representing the candidate CFO as ω, this cost function can be written according to equation (15), where $$\sum_{v=1}^{N_r} R_{\bar{y}v} = D_N(w_o) F_N^H T_{zp} \left\{ \sum_{v=1}^{N_r} E[g(k) g^H(k)] \right\} T_{zp} F_N D_N(w_o) \cdot J_V(\omega) := \sum_{k=K}^{N-1} f_N^H\left(\frac{2\pi k}{N}\right) D_N^{-1}(\omega) R_{\bar{y}v} D_N(\omega) f_N\left(\frac{2\pi k}{N}\right) \quad (15)$$

Consequently, if $\omega = \omega_o$, then $D_N(\omega_o - \omega) = I_N$. Next, recall that the matrix $F_N^H T_{zp}$ is orthogonal to $\{f_N(2\Pi n/N)\}_{n=K}^{N-1}$. Therefore, if $\omega = \omega_o$, the cost function $J(\omega_o)$ is zero in the absence of noise. However, for this to be true, coo must be the unique minimum of $J(\omega)$. $\omega_o$ is the unique zero of $J(\omega)$ if $$\sum_{v=1}^{N_r} E[g(k) g^H(k)]$$

has full rank as established in Proposition 1 below.

Proposition 1 If $E[b_\mu(k) b_{\mu H}^H(k)]$ is diagonal, $$\sum_{v=1}^{N_r} E[b_\mu(k) b_{\mu H}^H(k)]$$

has full rank, $E[c_\mu(k) c_{\mu H}^H(k)] = 0$, and $E[c_{\mu 1}(k) c_{\mu 1}^H(k)] = 0$, $\forall \mu 1, \neq \mu 2$, then $$\sum_{v=1}^{N_r} E[g_v(k) g_v^H(k)]$$

has full rank.

Training block $b_\mu(k)$ satisfies the conditions of proposition 1. Using the result of Proposition 1

$$\sum_{v=1}^{N_r} E[g_v(k) g_v^H(k)]$$

has full rank, it follows that $J(\omega) \geq J(\omega_o)$, where the equality holds if and only if $\omega = \omega_o$. Therefore, CFO estimates $\hat{\omega}_o$ can be found by minimizing $J(\omega)$ according to equation (16).

$$\hat{\omega}_o = \arg_\omega^{min} J_v(\omega) \quad (16)$$

Because of subcarrier hopping, $J(\omega)$ has a unique minimum in $[-\Pi, \Pi)$ regardless of the position of channel nulls. This establishes identifiability of $\hat{\omega}_o$ and shows that the acquisition range of the CFO estimator given in equation (16) is $[-\Pi, \Pi)$, which is the full range.

Based on the CFO estimates produced by equation (16), the terms that depend on coo can be removed from $\{\bar{y}_v(k)\}_{k=0}^{M-1}$ 30 and channel estimation can be performed. In order to derive the MIMO channel estimator, the CFO estimate is temporarily assumed to be perfect, i.e. $\hat{\omega}_o = \omega_o$. After each of CFO estimators 29 remove the CFO related terms from $\bar{y}_v(k)$ 30, each of FFT units 31 take the FFT of the corresponding block $\bar{y}_v(k)$ 30 and removes the null subcarriers by multiplying the corresponding blocks $\bar{y}_v(k)$ 30 with $T_{zp}^T$ to obtain $z_v(k)$ 32 according to equation (17), where $\xi_v(k) := e^{-\omega_o(kP+L)} T_{zp}^T F_N D_N^{-1}(\hat{\omega}_o) \bar{y}_v(k)$.

$$z_v(k) = e^{-j\omega_o(kP+L)} T_{zp}^T F_N D_N^{-1}(\hat{\omega}_o) \bar{y}_v(k) = \sum_{\mu=1}^{N_t} D_K(\tilde{h}^{(v,\mu)}(k))(P_A c_\mu(k) + P_B b_\mu(k)) + \xi_v(k) \quad (17)$$

From the design of $P_A$ and $P_B$ in equations (6) and (7) respectively, it can be inferred that $P_A^T D_K(\tilde{h}^{(v,\mu)}(k)) P_B = 0$. This allows the training symbols to be separated from the received information-bearing symbols in accordance with equations (18) and (19), where equation (18) represents the received information-bearing symbols and equation (19) represents the received training symbols.

$$z_{v,c}(k) := P_A^T z_v(k) = \sum_{\mu=1}^{N_t} P_A^T D_K(\tilde{h}^{(v,\mu)}(k)) P_A c_\mu(k) + \xi_{v,c}(k) \quad (18)$$

$\xi_{v,c}(k):=P^T_A\xi_v(k)$ and $+\xi_{v,b}(k):=P^T_B\xi_v(k)$. By the definitions of $P_B$ in equation (6) and the de-hopping code in equation (11), the identity in equation (20) can be formed, where $\tilde{h}_b^{(v,\mu)}$ comprises the first $N_b$ entries of $\tilde{h}^{(v,\mu)}$, the $N_b\times(L+1)$ matrix $F(k)$ comprises the first $L+1$ columns and $q_k$ related $N_b$ rows of $F_N$, and $h^{(v,\mu)}:=[h^{(v,\mu)}(0),\ldots,h^{(v,\mu)}(L)]^T$.

$$D_K(\tilde{h}^{(v,\mu)}(k))P_B = P_B D_{N_b}(\tilde{h}_b^{(v,\mu)}(k)) = P_B \text{ diag } [F(k)h^{(v,\mu)}] \qquad (20)$$

Because $P^T_B P_B = I_{N_b}$, equation (20) can be re-expressed according to equation (21) where $B_\mu(k):=\text{diag}[b_\mu(k)]$.

$$z_{v,b}(k) = \sum_{\mu=1}^{N_t} B_\mu(k)F(k)h^{(v,\mu)} + \xi_{v,b}(k) \qquad (21)$$

Note that the length for each block of training symbols, $N_b$, can be smaller than $N_t(L+1)$ by sparsely distributing training symbols across blocks. In some embodiments, $N_t+1$ training symbols are inserted every $N+L$ transmitted symbols resulting in a bandwidth efficiency of $(N-N_t-1)/(N+L)$. Collecting M blocks $z_{v,b}(k)$, the input-output relationship based on training symbols and channels can be expressed according to equation (22), where $h_v$ comprises $\{h^{(v,\mu)}\}_{\mu=1}^{N_t}$, $\bar{\xi}_{v,b}:=[\bar{\xi}_{v,b}^T(0),\ldots,\bar{\xi}_{v,b}^T(M-1)]^T$, and B is given in equation (23). Note that B is the same for all $N_r$ receive antennas $$\bar{z}_{v,b} = Bh_v + \bar{\xi}_{v,b} \qquad (22)$$

$$B = \begin{pmatrix} B_1(0)P^T_B F(0) & \cdots & B_{N_T}(0)P^T_B F(0) \\ \vdots & \ddots & \vdots \\ B_1(M-1)P^T_B F(M-1) & \cdots & B_{N_t}(M-1)P^T_B F(M-1) \end{pmatrix} \qquad (23)$$

By collecting $z_{v,b}$'s from all $N_r$ transmit antennas into $\bar{z}_{v,b}:=[\bar{z}_{1,b}^T,\ldots,\bar{z}_{N,b}^T]^T$, the linear MMSE (LMMSE) channel estimator can be expressed according to equation (24), where $R_h:=E[hh^H]$ with $h:=[h_1^T,\ldots,h_{N_r}^T]^T$ as the channel covariance matrix, and 2 represents the noise variance.

$$\hat{h}_{LMMSe}:=:=(\sigma^2 R_h^{-1} + I_{N_r}\otimes(B^H B))^{-1}(I_{N_r}\otimes B^H)\bar{z}_b \qquad (24)$$

$R_h$ is typically unknown, thus, $M\,N_b \geq N_t(L+1)$, and $B^H B$ is selected to have full rank. In some embodiments, channel estimation unit 33 is a least squares (LS) estimator given according to equation (25).

$$\hat{h}_{LS}:=:=(I_{N_r}\otimes(B^H B))^{-1}(I_{N_r}\otimes B^H)\bar{z}_b \qquad (25)$$

If the number of training symbols per block is $N_b=N_t$, a minimum number of $M=L+1$ blocks are required to be collected by receiver 6 in order to guarantee that LS estimation can be performed since $h^{(v,\mu)}$ with $L+1$ entries are estimated at the with receive antenna. In some embodiments, channel estimation unit 33 can be adjusted to collect a variable number of blocks based on the complexity that can be afforded.

The number of $b_\mu(k)$'s satisfying the conditions of Proposition 1 is not unique. For example, $N_b=N_t$ may be selected and the training sequences for different transmit antennas may be designed according to equation (26).

$$b_\mu(k)=[0_{\mu-1}^T,b0_{N_t-\mu_r}^T]^T \qquad (26)$$

Further, assume N and M are integer multiples of $L+1$. Because the hopping step size in equation (8) is $N/(L+1)$, $B^H B$ can be designed according to equation (27).

$$B^H B = \begin{bmatrix} \sum_{m=0}^{M-1} F^H(m)B_1^H(m)B_1(m)F(m) & & \\ & \ddots & \\ & & \sum_{m=0}^{M-1} F^H(m)B_{N_t}^H(m)B_{N_t}(m)F(m) \end{bmatrix} = \frac{|b|^2 M}{N} I_{N_t(L+1)} \qquad (27)$$

Therefore, the number of blocks N improves channel estimation performance. However, this is true when CFO estimation is perfect. When CFO estimation is imperfect, the contrary is true: fewer blocks should be used because the residual CFO estimation error degrades BER performance when the block index is large.

Thus far, the CFO and $N_tN_r$ channels have been estimated, but a residual CFO referred to as phase noise remains. Phase noise degrades the BER severely as the number of blocks used for channel estimation increases.

Using the CFO offset $\hat{\omega}_o$ produced by each of CFO estimators 29, the received transmission block can be expressed according to equation (28) where $\hat{\omega}_o-\omega_o$ is the phase noise and $\xi_v(k):=e^{-j\hat{\omega}_o(kP+L)}T_{zp}^T F_N D_N^{-1}(\hat{\omega}_o)\bar{v}_v(k)$.

$$\tilde{y}_v(k)=e^{-j(\omega_o-\hat{\omega}_o)(kP+L)}D_N(\omega_o-\hat{\omega}_o)F_N^H T_{zp}g_v(k)+\xi_v(k) \qquad (28)$$

When $\hat{\omega}_o$ is sufficiently accurate, the matrix $D_N(\omega_o-\hat{\omega}_o)$ can be approximated by an identity matrix of the same size. However, the phase term $(\hat{\omega}_o-\omega_o)(kP+L)$ becomes increasingly large as the block index k increases. Without mitigating the phase noise, it degrades not only the performance of channel estimation unit 33, but also the BER performance over time.

In order to enhance the BER performance, phase estimation unit 35 uses the non-zero training symbols in $b_\mu(k)$, which were previously designed to estimate channel 8, to estimate the phase noise per block. For example, assume that for the kth block, the estimated channel is obtained by using the LMMSE channel estimator given in equation (24). Further, also assume that the training sequence is designed as given in equation (26) and that channel estimation is perfect, i.e. $D_N(\omega_o-\hat{\omega}_o)\approx I_N$. As a result, after equalizing channel 8, for the with receive antenna and the μth entry of $z_{v,b}(k)$ 30, the equivalent input-output relationship is given according to equation (29), where $\phi_v(k):=[z_{v,b}(k)]_\mu/[\tilde{h}_b^{(v,\mu)}]_\mu$, and $w_v$ is the equivalent noise term after removing the channel.

$$\phi_v(k)=e^{-j(\omega_o-\hat{\omega}_o)(kP+L)}b+w_v \qquad (29)$$

Because $b$, is known the phase $(\hat{\omega}_o-\omega_o)(kP+L)$ can be estimated based on the observations from $N_r$ receive antennas on a per block basis. In order to perform this phase estimation step, additional training symbols do not need to be inserted and the extra complexity is negligible. The performance improvement resulting from phase estimation is illustrated the performance graphs given below.

After CFO estimation, the FFT has been performed, and channel estimation space-time decoder 37 decodes the space-time encoded information-bearing symbols to produce the information-bearing symbol estimates ŝ 38.

Although estimation for a single common CFO and MIMO channel has been described in a single-user system involving $N_t$ transmit antennas and $N_r$ receive antennas, communication system 2 is not limited to such systems. Communication system 2, can easily be modified to estimate CFOs and channel in a multi-user downlink scenario where the base station deploys $N_t$ transmit antennas to broadcast OFDM based transmissions to $N_r$ mobile stations each of which is equipped with one or more antennas. In this case, there are $N_r$ distinct CFOs and $N_tN_r$ frequency-selective channels to estimate. However, each mobile station can still apply perform CFO estimation as given in equation (16). In addition, it can be verified that the LS channel estimator given in equation (25) can be separated from CFO estimation to estimate the $N_t$ channel impulse responses in $h_v$, for $v=1, \ldots, N_r$, on a per receive antenna basis.

FIG. 3 illustrates example transmission blocks 40A, 40B, and 40C generated by transmitter 4 of communication system 2. In particular, transmission blocks 40A, 40B, and 40C correspond to consecutive transmission blocks $\bar{u}_\mu(k)$ 16 at the output of one of training symbol insertion units 15 with block index k=0, k=1, and k=2, respectively. Generally, each transmission block 40A-40C includes space-time encoded information bearing symbols 42A-C, null subcarriers 44A-44C, and training symbols 46A-46C, respectively. In particular, training symbol insertion units 15 insert blocks of $N_t+1$ training symbols 46A-46C according to equation (26) as a preamble to space-time encoded blocks of information-bearing symbols 42A-C. In some embodiments, training symbols 46A-46C are inserted every N+L transmitted symbols, where a cyclic prefix of L symbols is inserted by cyclic prefix insertion unit 19, resulting in a bandwidth efficiency of $(N-N_t-1)/(N+L)$. Additionally, the number of training symbols inserted may be adjusted depending on the channel's coherence time and the pertinent burst duration Null subcarriers 44A-44C are inserted within transmission blocks 40A-C, respectively, by applying the hopping code given in equation (8) so that the position of null subcarriers 44A-44C change from block to block. In some embodiments, N−K null subcarriers are inserted with hop-step N/(L+1) in each transmission block 40A-C. Additionally, null subcarriers may be inserted in accordance with conventional OFDM standards such as IEEE 802.11a and IEEE 802.11g resulting in easily implemented, low-complexity systems.

Figure 4:
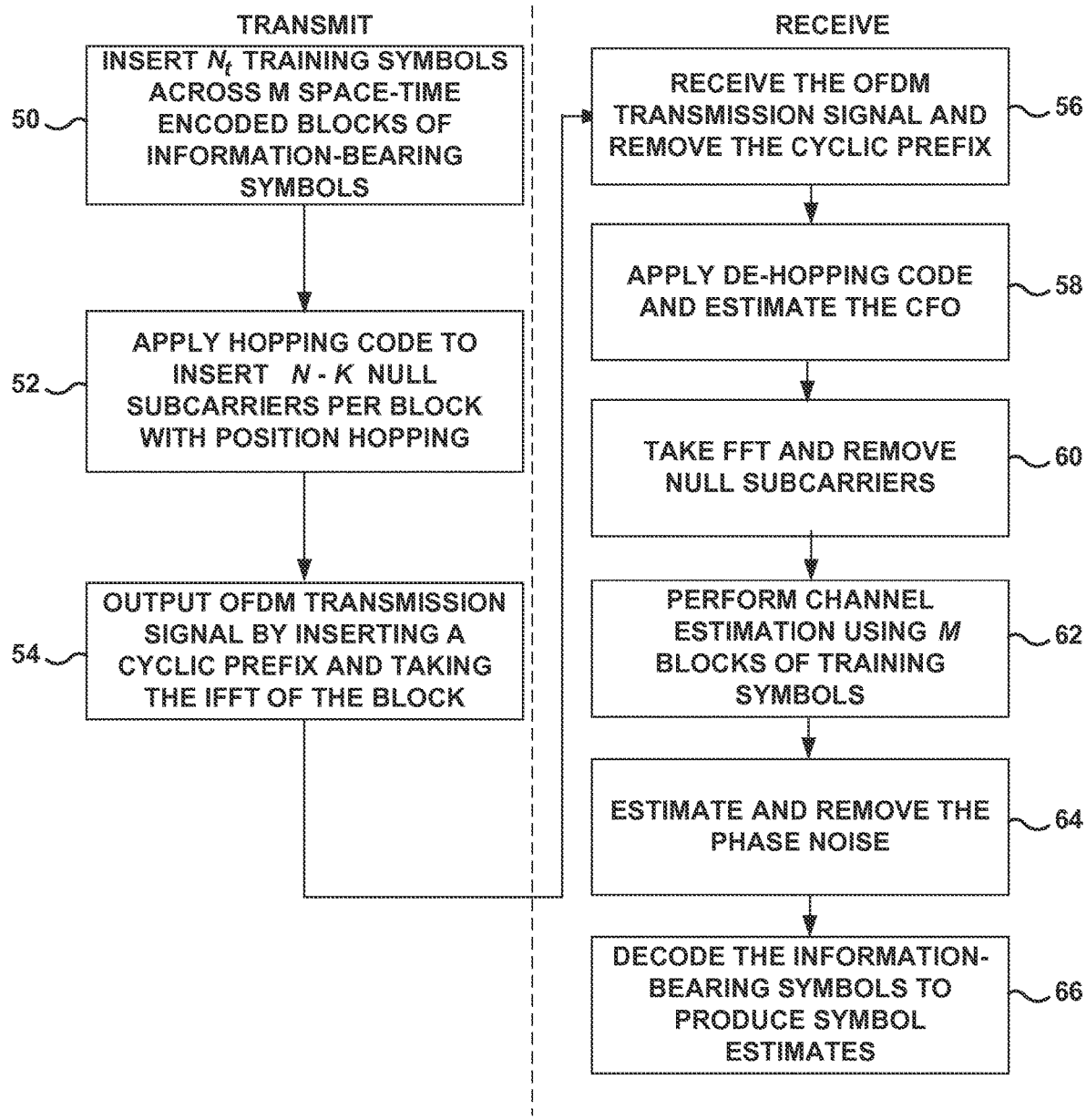
FIG. 4 is a flowchart illustrating an example mode of operation of the communication system of FIG. 2 in which a receiver performs CFO estimation and channel estimation on an OFDM transmission signal output by a transmitter.

FIG. 4 is a flowchart illustrating an example mode of operation of communication system 2 in which receiver 6 performs CFO, channel, and phase noise estimation on an OFDM transmission signal output by transmitter 4. Generally, transmitter 4 inserts $N_t$ training symbols across M space-time encoded blocks of information-bearing symbols (step 50). The training symbols are inserted as a sequence of blocks of training symbols $b_\mu(k)$ as described herein. In some embodiments, the number of training symbols inserted may be adjusted depending on the channel's coherence time and the pertinent burst duration. Additionally, transmitter 4 may insert two or more training symbols per block of space-time encoded information-bearing symbols by applying a first and a second permutation matrix, PA and PB respectively, as described previously. After inserting the training symbols, transmitter 4 applies a hopping code to insert N−K null subcarriers per block such that the position of the null subcarriers changes from block to block (step 52). The hopping code may be defined as in equation (8) with hop-step N/(L+1). It may be particularly advantageous to insert null subcarriers in accordance with conventional OFDM standards such as IEEE 802.11a and IEEE 802.11g. Transmitter 4 then outputs an OFDM transmission signal by first inserting a cyclic prefix and taking the IFFT of the resulting block of training and information-bearing symbols (step 54).

Receiver 6 receives the OFDM transmission signal and removes the cyclic prefix (step 56). Receiver 6 then applies a de-hopping code and estimates the CFO (step 58). The de-hopping code rearranges the null subcarriers so that the null subcarriers in different blocks are at the same position in their respective blocks, and the CFO is estimated as described previously. Because of the null subcarrier hopping, the CFO estimation and channel estimation can be separated and the CFO can be estimated over the full acquisition range $[-\Pi, \Pi)$. The FFT is taken and the null subcarriers are removed (step 60) by multiplying $\bar{y}_v(k)$ 30 with zero padding matrix $T^T_{zp}$ to obtain $z_v(k)$ 32. Channel estimation is performed over M blocks of training symbols (step 62). As described previously, each training block length Nb can be smaller than $N_t(L+1)$ by sparsely distributing training symbols across Mblocks. In some embodiments, one of a LMMSE channel estimator or a LS channel estimator may be applied to the Mblocks to estimate channel 8. In order to improve the BER performance of receiver 6, the phase noise is estimated and removed (step 64) based on the observations from $N_r$ receive antennas on a per block basis. Symbol estimates are then produced by decoding the space-time encoded information-bearing symbols (step 66).

FIGS. 5-12 are graphs that present simulations of OFDM transmissions over MIMO frequency-selective channels using the described techniques for estimating the CFO, channel, and phase noise. In order to benchmark the performance of the techniques described herein, the Crame'r-Rao lower bounds (CRLB) for the CFO are derived. Starting from the model of communication system 2 given in equation (12), the CRLB for $\omega_o$ is given according to equation (30), where $D(k):=\mathrm{diag}[Pk+L, \ldots, P(k+1)-1]$, and $R_{gg}^{(v)}:=E[g_v(k)\, g_v^H(k)]$.

$$CRLB_\omega = \left( \frac{2}{\sigma_{\bar{v}}^2} \sum_{v=1}^{N_r} \sum_{k=0}^{M-1} tr\left[ D(k) F_N^H T_{zp} R_{gg}^{(v)} F_N D(k) \right] \right)^{-1} \quad (30)$$

It follows from equation (30) that as the number of blocks increases, the CRLB for CFO decrease. Similarly, the signal-to-noise ratio (SNR) versus CRLB decreases as the number of blocks increases. If N>>N−K, i.e. the number of subcarriers is much greater than the number of null subcarriers, $T_{zp} \approx I_N$. Assuming that $R_{gg}^{(v)} = \varepsilon I_N$, where $\varepsilon$ represents the average symbol energy, and P, M are sufficiently large equation (31) can be obtained.

$$CRLB_\omega = \frac{\sigma_{\bar{v}}^2}{\varepsilon} \frac{3}{2(P-L)P^2 M^3 N_r} \quad (31)$$

Equation (31) explicitly shows that the CRLB of the CFO is independent of the channel and the number of transmit antennas, and that the CRLB of the CFO is inversely proportional to the SNR, the number of receive antennas, and the cube of the number of space-time data.

By assuming that CFO estimation is perfect, the performance of the channel estimator can be derived. If the LMMSE channel estimator given in equation (24) is used, then the mean-square error of the channel estimator is given according to equation (32).

$$\sigma^2_{lmmse} = tr\left[\left(R_h^{-1} + \frac{M|b|^2}{N\sigma^2}I_{N_t N_r(L+1)}\right)^{-1}\right] \quad (32)$$

Similarly, if the LS channel estimator given in equation (25) is used, the corresponding mean-square error is given by equation (33).

$$\sigma^2_{ls} = \frac{NN_t N_r(L+1)\sigma^2}{M|b|^2} \quad (33)$$

Equations (32) and (33) both imply that as the number of channels increases, the channel mean square error increases. However, this increase can be mitigated by collecting a greater number of blocks, i.e. more training symbols, provided that the CFO estimate is sufficiently accurate.

In all simulations, HIPERLAN/2 channel model B, given in Table 1, is used to generate the channels. The channel order is L=15 and the taps are independent with different variances. The OFDM block length is designed as N=64 as in HIPERLAN/2. The noise is additive white Gaussian noise with zero-mean and variance $\sigma_n^2$. The SNR is defined SNR=$\epsilon/\sigma_n^2$ and the information-bearing symbols are selected from a quadrature phase-shift keying (QPSK) constellation.

(NMSE), defined as $E[\|\hat{\omega}_o-\omega_o\|^2/\|\omega_o\|^2]$, verses SNR. As the number of OFDM blocks M increases, the NMSE of CFO decreases. However, the improvement is relatively small, which suggests that using M=K OFDM blocks is sufficient to estimate the CFO.

Figure 7:
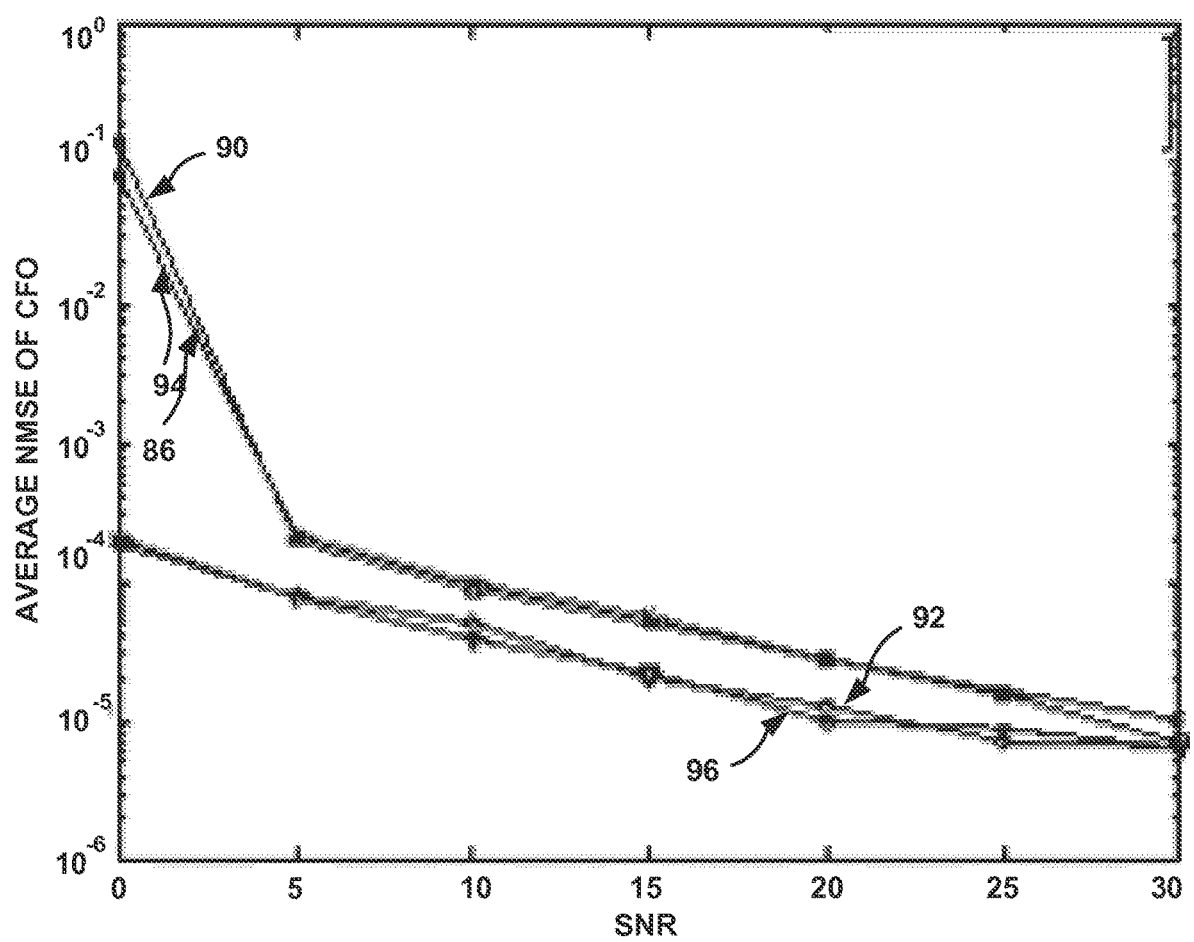

FIG. 7 is a graph comparing the effect of the number of antennas on CFO estimation using the LS channel estimator given in equation (25). The average NMSE of the CFO with the number of blocks M=N are plotted as lines 90, 92, 94, and 96 for systems having $(N_t, N_r)$=(1, 1), $(N_t, N_r)$=(1, 2), $(N_t, N_r)$=(2, 1), $(N_t, N_r)$=(2, 2), respectively. For plots 90 and 92 4 non-zero pilot symbols and one null subcarrier per OFDM transmission block are used. FIG. 7 illustrates that as the number of receive antennas increases, the performance of the CFO estimation techniques described herein increases due to the receive-diversity gains.

Figure 8:
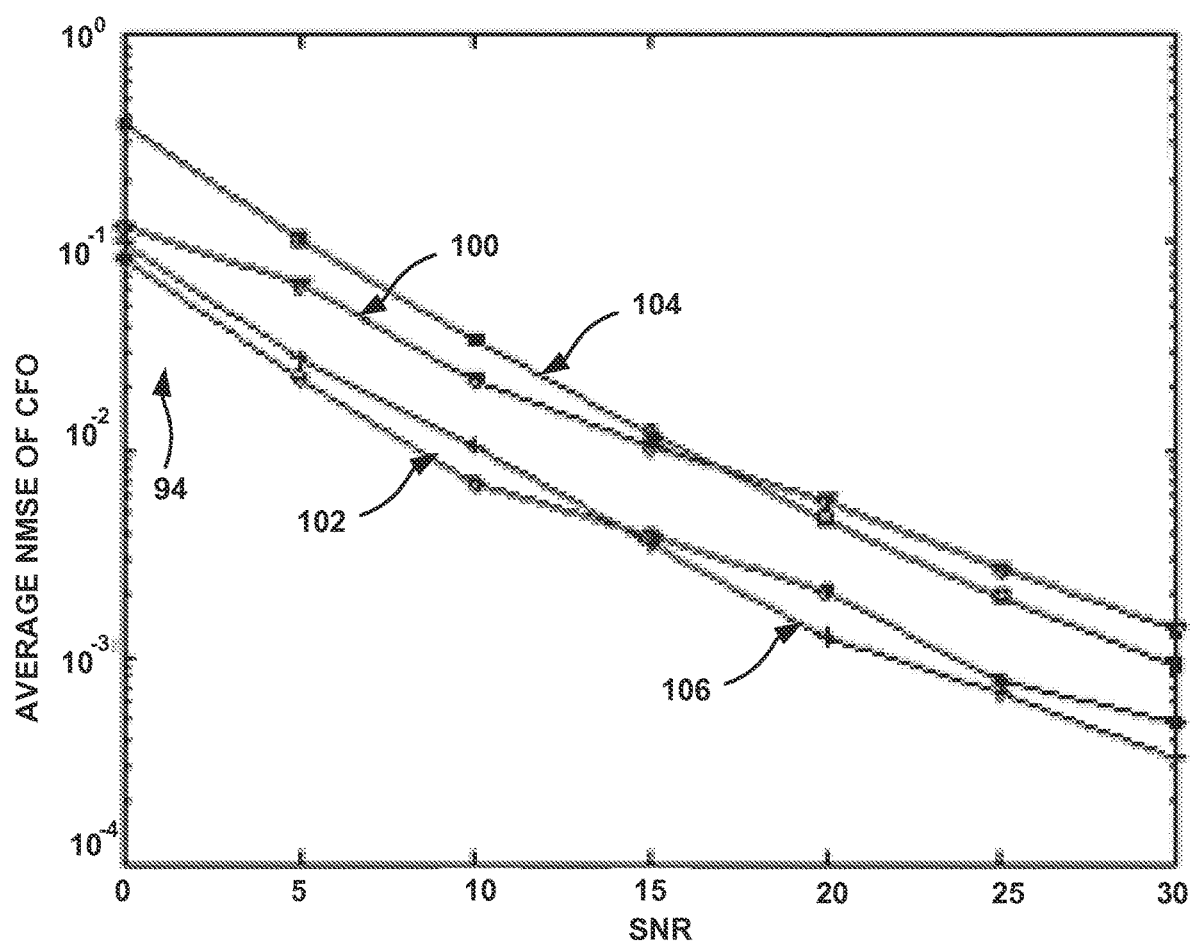

FIG. 8 is a graph comparing the CFO estimation techniques described herein with a technique described in M. Morelli and U. Mengali, "An improved frequency offset estimator for OFDM applications," IEEE Communications Letters, vol. 3, pp. 75-77, March 1999, for the single antenna case. For the presently described techniques, one non-zero training symbol and one zero training symbol for each block are used for each OFDM transmission block and 64 blocks are collected to perform CFO estimation. In order to maintain the same transmission rate, M. Morelli's and U. Mengali's previously referenced technique has a training block length of 128 with 8 identical parts. FIG. 8 depicts two cases: random CFO in [−0.06 Π, 0.06 Π] and fixed CFO with $\omega_o$=Π/128. In both cases the CFO is chosen within the acquisition range of M. Morelli and U. Mengali's previously

TABLE 1

| tap no. | 0 | 1 | 2 | 3 | 4 | 5 | 6 | 7 |
|---|---|---|---|---|---|---|---|---|
| variance | 2.60e−01 | 2.44e−01 | 2.24e−01 | 7.07e−02 | 7.93e−02 | 4.78e−02 | 2.95e−02 | 1.78e−02 |
| tap no. | 8 | 9 | 10 | 11 | 12 | 13 | 141 | 15 |
| variance | 1.07e−02 | 6.45e−03 | 5.01e−03 | 2.51e−03 | 0 | 1.48e−03 | 0 | 6.02e−04 |

Figure 5:
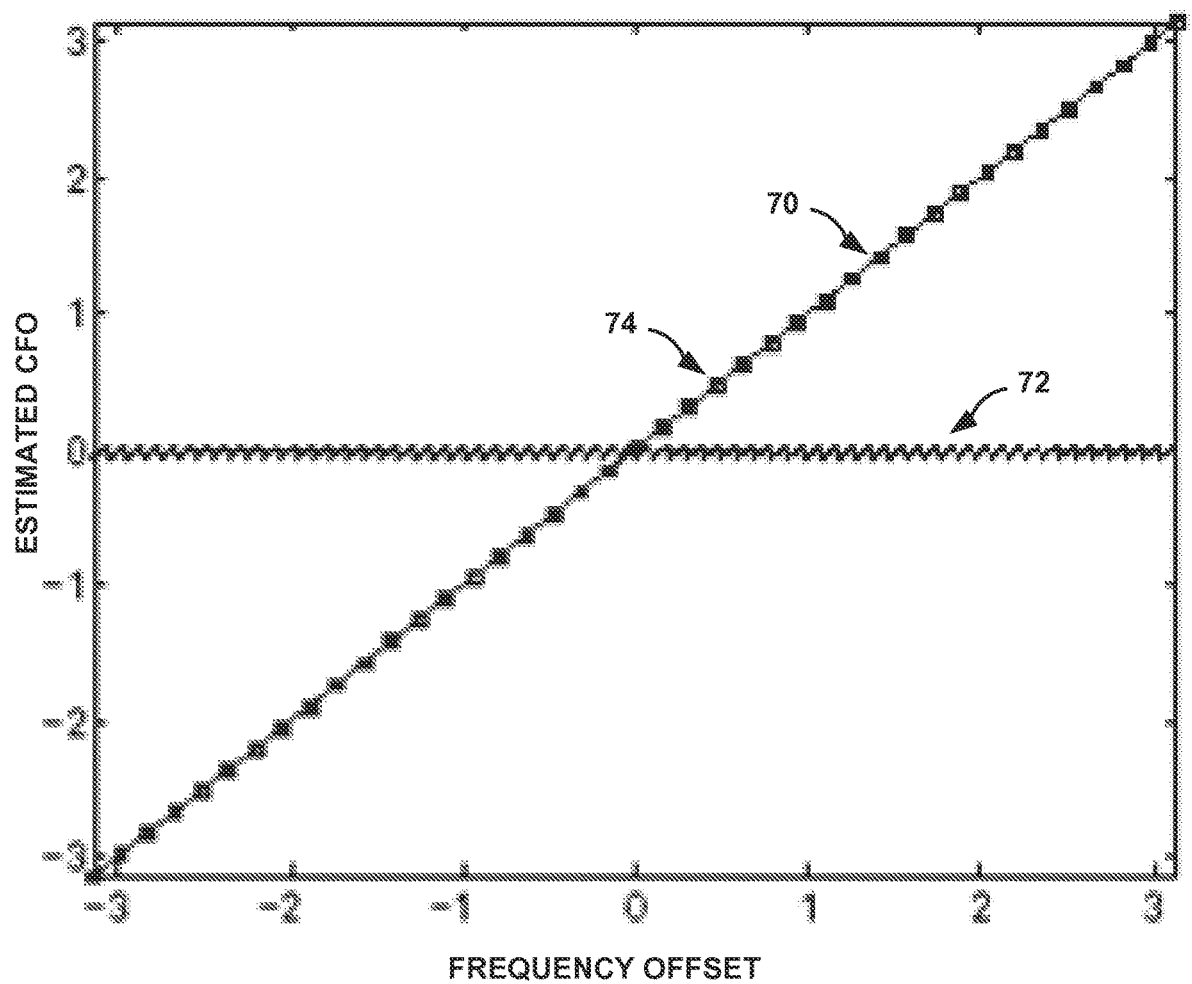
FIGS. 5-12 are graphs illustrating performance estimates of the CFO and channel estimation techniques described herein.

FIG. 5 is a graph comparing the true frequency offset versus the estimated CFO for the CFO estimation techniques described herein (plot 70) and an algorithm described in P. H. Moose, "A technique for orthogonal frequency division multiplexing frequency offset correction," IEEE Transactions on Communications, vol. 42, pp. 2908-1314, October 1994 (plot 72). The ideal line (74) is also shown for comparison and illustrates that the currently described CFO estimation techniques (plot 70) has the full acquisition range [−Π, Π), whereas the algorithm described in the P. H. Mooses reference (plot 72) has an acquisition range proportional to the OFDM block size N.

Figure 6:
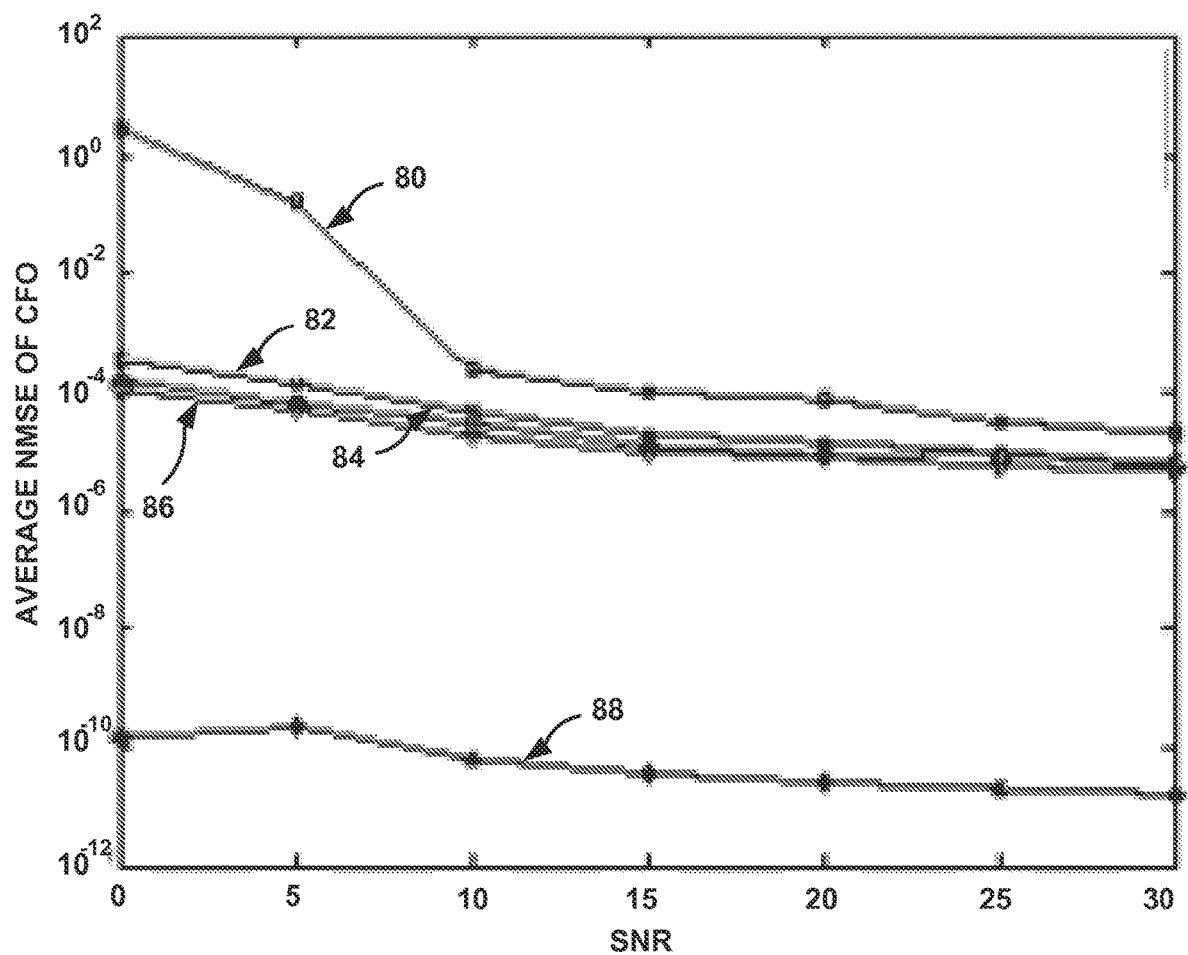

FIG. 6 is a graph comparing the effect of the number of blocks over which channel estimation is performed for the presently described CFO estimation techniques with $N_t$=2 and $N_r$=2. The CFO is randomly selected to in the range [−0.5 Π, 0.5 Π]. In each OFDM transmission block, there are four non-zero training symbols, 4 zero symbols to remove interference from other channels, and one zero symbol serving as a null subcarrier. The placement of the training symbols is in accordance with the techniques herein, and different numbers of blocks are use: M=L+1 (plot 80), M=K (plot 82), 2K (plot 84), 3K (plot 86), and the CRLB derived previously with M=K (plot 88) for comparison. FIG. 6 depicts the CFO normalized mean square error referenced technique. In both cases, the CFO techniques described herein, 100 and 102 for the fixed CFO case and the varying CFO case, respectively, are comparable with M. Morelli and U. Mengali's technique for the fixed CFO case 104 and varying CFO case 106.

Figure 9:
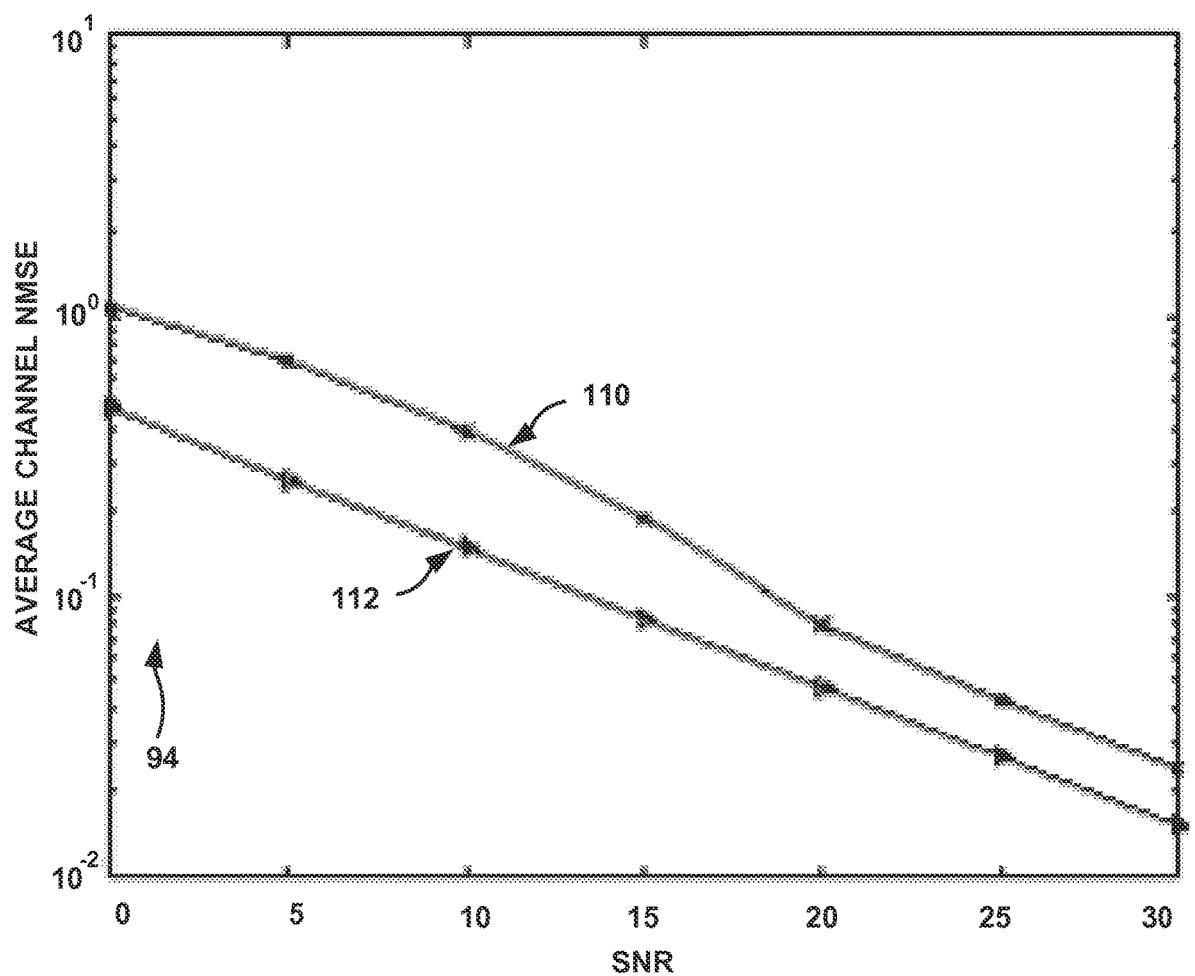

FIG. 9 is a graph comparing the performance of MIMO channel estimation with $(N_t, N_r)$=(2, 2) and the CFO being randomly selected in the range [−0.5 Π, 0.5 Π]. By collecting 64 observations from 8 OFDM transmission blocks and using the LS channel estimator given in equation (25), the MIMO channels can be estimated. In order to measure the channel estimation quality, the average channel NMSE is computed as $E[\|f\hat{h}-h\|^2/\|h\|^2]$, where $\hat{h}$ is obtained using the LS method. The performance for MIMO OFDM transmissions with estimated CFO 110 using the techniques described herein are compared with the ideal case in which the CFO is perfectly known 112. FIG. 9 illustrates a 4.5 dB loss due to the CFO estimation error.

Figure 10:
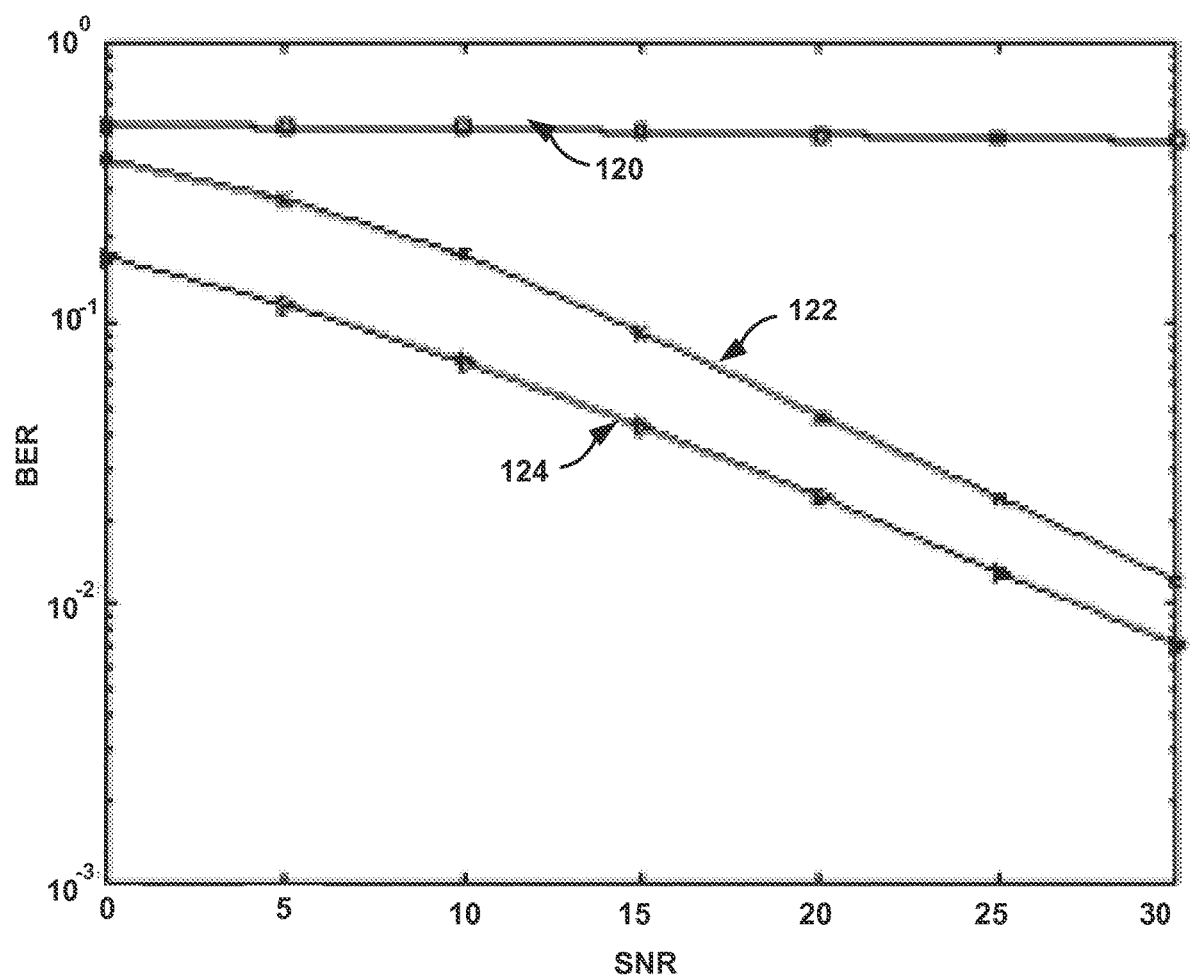

FIG. 10 compares the BER performance of the CFO and channel estimation techniques described herein without phase noise estimation (plot 120), with phase noise estimation (plot 122), and with perfect phase noise estimation (plot 124) with increasing SNR. The simulation parameters are the same as those used in FIG. 9 and zero-forcing equalization is used to estimate the information-bearing symbols.

The BER performance of all the simulations degrades as the number of blocks increase due to phase noise. As expected, the plot with phase noise estimation 122 performs better than the plot without phase noise estimation 120 and the plot with perfect phase noise estimation 124 provides a benchmark.

Figure 11:
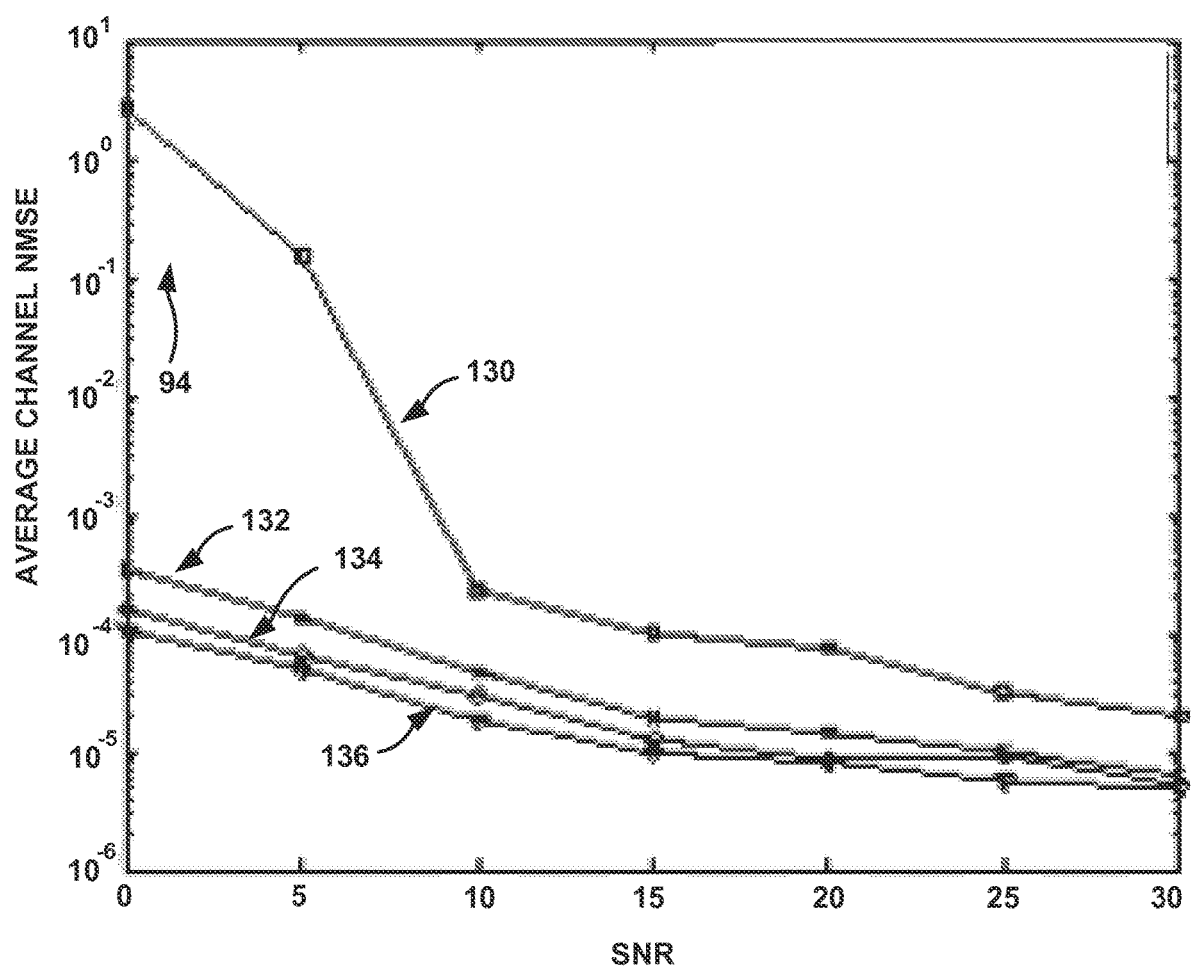
Figure 12:
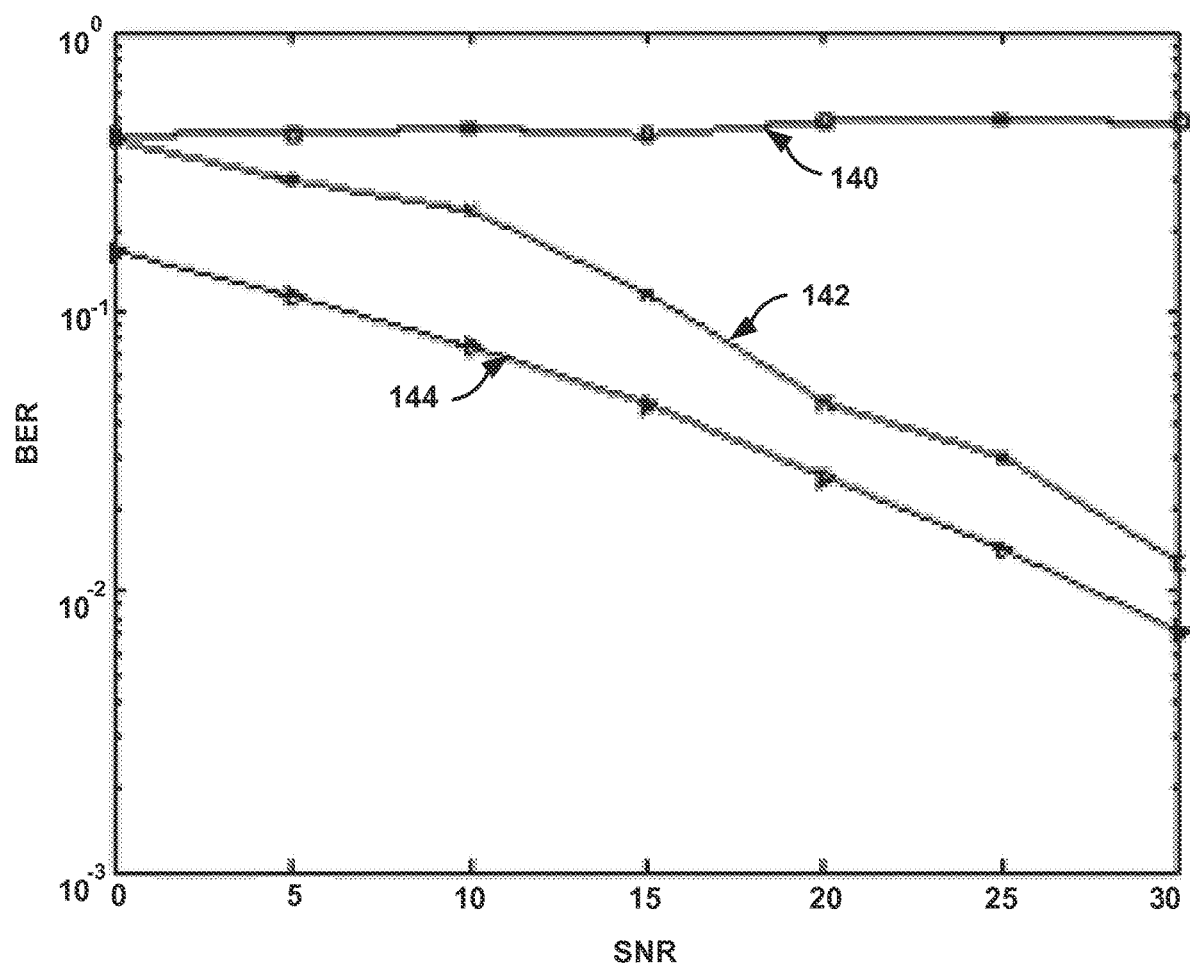

FIGS. 11 and 12 compare the estimation of $N_r$ CFOs in multi-user broadcast OFDM systems. Simulations are performed with $(N_t, N_r)=(2, 2)$ and CFOs are randomly selected in the range $[-0.5 \Pi, 0.5 \Pi]$. In particular, FIG. 11 illustrates the average channel NMSE with varying SNRs using a $N_r \times 1$ vector CFO estimator for the presently described techniques with M=L+1 (plot 130), M=K (plot 132), 2K (plot 134), 3K (plot 136). Similarly, FIG. 12 illustrates the BER performance with varying SNRs using the presently described CFO and channel estimation techniques without phase noise estimation (plot 140), with phase noise estimation (plot 142), and with perfect phase noise estimation (plot 144). FIGS. 11 and 12 illustrate results which corroborate with FIGS. 9 and 10 respectively. Consequently, the described techniques which were illustrated in detail for a single-user system involving $N_t$ transmit antennas and $N_r$ receive antennas, can be applied with similar results in a multi-user downlink scenario where the base station deploys $N_t$ transmit antennas to broadcast OFDM based transmissions to $N_r$ mobile stations each of which is equipped with one or more antennas.

Various embodiments of the invention have been described. The invention provides techniques for carrier frequency offset (CFO) and channel estimation of orthogonal frequency division multiplexing (OFDM) transmissions over multiple-input multiple-output (MIMO) frequency-selective fading channels. In particular, techniques are described that utilize training symbols in a manner that CFO and channel estimation are decoupled from symbol detection at the receiver. Unlike conventional systems in which training symbols are inserted within a block of space-time encoded information-bearing symbols to form a transmission block, the techniques described herein insert training symbols over two or more transmission blocks.

The described techniques can be embodied in a variety of transmitters and receivers used in downlink operation including cell phones, laptop computers, handheld computing devices, personal digital assistants (PDA's), and other devices. The devices may include a digital signal processor (DSP), field programmable gate array (FPGA), application specific integrated circuit (ASIC) or similar hardware, firmware and/or software for implementing the techniques. If implemented in software, a computer readable medium may store computer readable instructions, i.e., program code, that can be executed by a processor or DSP to carry out one of more of the techniques described above. For example, the computer readable medium may comprise random access memory (RAM), read-only memory (ROM), non-volatile random access memory (NVRAM), electrically erasable programmable read-only memory (EEPROM), flash memory, or the like. The computer readable medium may comprise computer-readable instructions that when executed in a wireless communication device, cause the wireless communication device to carry out one or more of the techniques described herein. These and other embodiments are within the scope of the following claims.

The invention claimed is:

1. A method comprising:
receiving, via a first antenna of two or more antennas, a first transmission signal in accordance with a first block of output symbols of two or more blocks of output symbols for orthogonal frequency division multiplexing (OFDM) transmissions over the two or more antennas, wherein the two or more blocks of output symbols comprise:
two or more blocks of information-bearing symbols in space and time within the two or more blocks of output symbols, and training symbols within the two or more blocks of information-bearing symbols, and null subcarriers within the two or more blocks of information-bearing symbols at positions determined by a hopping code, wherein the training symbols are inserted in a manner that decouples carrier frequency offset estimation from symbol detection;
receiving, via a second antenna of the two or more antennas, a second transmission signal in accordance with a second block of output symbols of the two or more blocks of output symbols;
performing the carrier frequency offset estimation based on the training symbols; and
performing symbol detection based on the two or more blocks of output symbols.

2. The method of claim 1, wherein each of the first transmission signal and the second transmission signal comprises a respective cyclic prefix within each of the two or more blocks of output symbols.

3. The method of claim 1, wherein the first transmission signal and the second transmission signal provide information for estimating a carrier frequency offset associated with the first transmission signal and the second transmission signal.

4. The method of claim 1, wherein the training symbols within the two or more blocks of information-bearing symbols collectively provide information for channel estimation.

5. The method of claim 1, wherein the training symbols are inserted in a manner that decouples the carrier frequency offset estimation and channel estimation from the symbol detection.

6. A system comprising:
two or more antennas; and
a base station coupled with the two or more antennas, wherein the base station is configured to perform operations comprising:
receiving, via a first antenna of two or more antennas, a first transmission signal in accordance with a first block of output symbols of two or more blocks of output symbols for orthogonal frequency division multiplexing (OFDM) transmissions over the two or more antennas, wherein the two or more blocks of output symbols comprise:
two or more blocks of information-bearing symbols in space and time within the two or more blocks of output symbols, and training symbols within the two or more blocks of information-bearing symbols, and null subcarriers within the two or more blocks of information-bearing symbols at positions determined by a hopping code, wherein the training symbols are inserted in a manner that decouples carrier frequency offset estimation from symbol detection;
receiving, via a second antenna of the two or more antennas, a second transmission signal in accordance with a second block of output symbols of the two or more blocks of output symbols;
performing the carrier frequency offset estimation and based on the training symbols; and performing symbol detection based on the two or more blocks of output symbols.

7. The system of claim 6, wherein each of the first transmission signal and the second transmission signal comprises a respective cyclic prefix within each of the two or more blocks of output symbols.

8. The system of claim 6, wherein the first transmission signal and the second transmission signal provide information for estimating a carrier frequency offset associated with the first transmission signal and the second transmission signal.

9. The system of claim 6, wherein the training symbols within the two or more blocks of information-bearing symbols collectively provide information for channel estimation.

10. The system of claim 6, wherein the training symbols are inserted in a manner that decouples the carrier frequency offset estimation and channel estimation from the symbol detection.

11. A system comprising:
two or more antennas; and
a mobile device coupled with the two or more antennas, wherein the mobile device is configured to perform operations comprising:
receiving, via a first antenna of two or more antennas, a first transmission signal in accordance with a first block of output symbols of two or more blocks of output symbols for orthogonal frequency division multiplexing (OFDM) transmissions over the two or more antennas, wherein the two or more blocks of output symbols comprise:
two or more blocks of information-bearing symbols in space and time within the two or more blocks of output symbols, and training symbols within the two or more blocks of information-bearing symbols, and null subcarriers within the two or more blocks of information-bearing symbols at positions determined by a hopping code, wherein the training symbols are inserted in a manner that decouples carrier frequency offset estimation from symbol detection;
receiving, via a second antenna of the two or more antennas, a second transmission signal in accordance with a second block of output symbols of the two or more blocks of output symbols;
performing the carrier frequency offset estimation based on the training symbols; and
performing symbol detection based on the two or more blocks of output symbols.

12. The system of claim 11, wherein each of the first transmission signal and the second transmission signal comprises a respective cyclic prefix within each of the two or more blocks of output symbols.

13. The system of claim 11, wherein the first transmission signal and the second transmission signal provide information for estimating a carrier frequency offset associated with the first transmission signal and the second transmission signal.

14. The system of claim 11, wherein the training symbols within the two or more blocks of information-bearing symbols collectively provide information for channel estimation.

15. The system of claim 11, wherein the training symbols are inserted in a manner that decouples the carrier frequency offset estimation and channel estimation from the symbol detection.

* * * * *